UNITED STATES PATENT OFFICE.

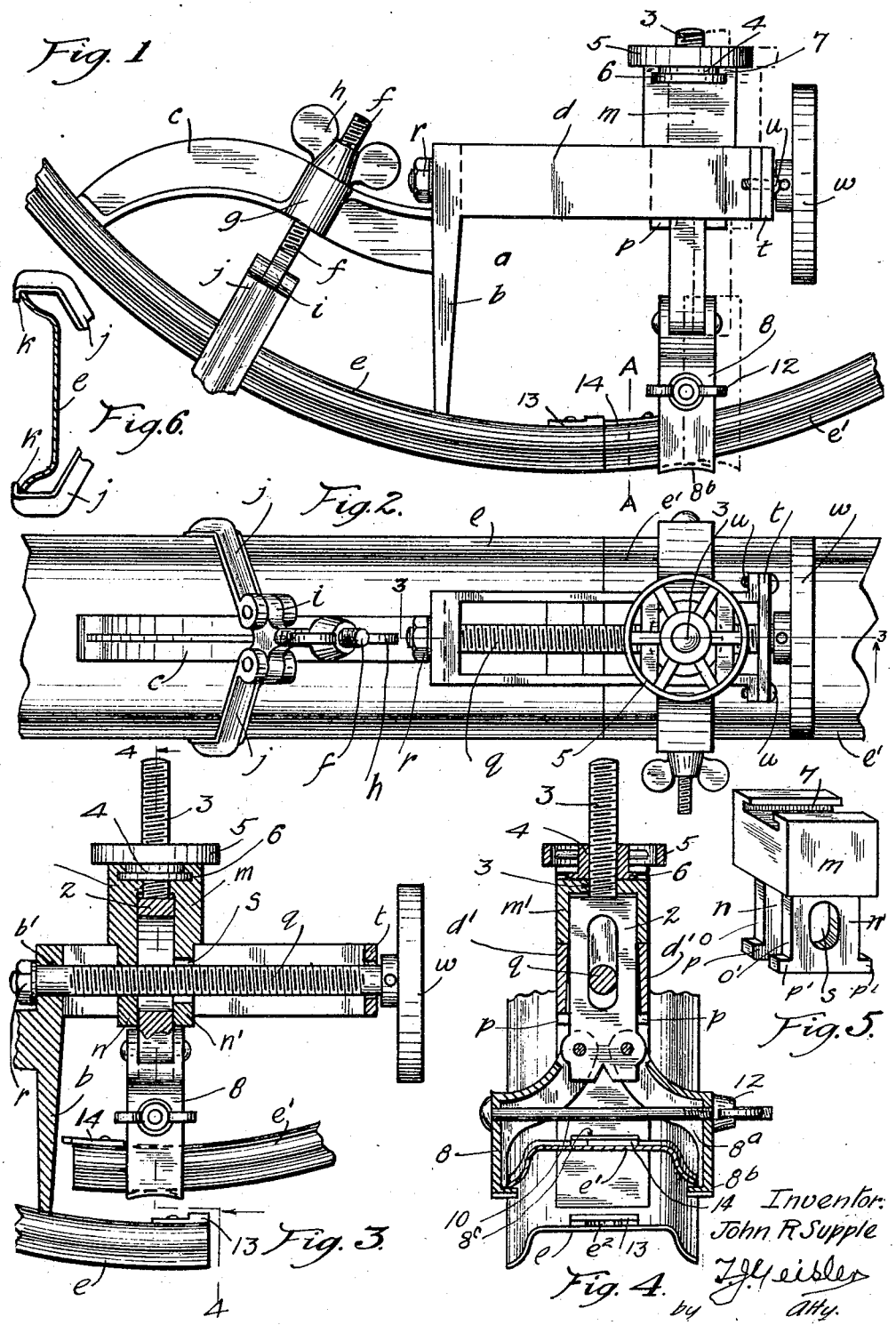

JOHN R. SUPPLE, OF PORTLAND, OREGON.

RIM BREAKER.

1,420,781. Specification of Letters Patent. Patented June 27, 1922.

Application filed May 11, 1920. Serial No. 380,459.

*To all whom it may concern:*

Be it known that I, JOHN R. SUPPLE, a citizen of the United States, and a resident of Portland, county of Multnomah, State of Oregon, have invented a new and useful Improvement in Rim Breakers, of which the following is a specification.

My invention relates to devices facilitating the removal and replacement of the split tire-rims of the wheels of automobiles.

The object of my invention is to provide a device which is simple in its construction and operation and readily applied, and which, furthermore, only requires a minimum amount of physical exertion in doing the work of removing or replacing the tire; in other words, the required power being applied by a very simple and safe manipulation of my device.

I attain my object by a device adapted for use in connection with split rims of all sizes, and operating to contract the rim so as to permit its convenient removal when the tire is to be removed, and also for re-expanding the rim when the tire is to be remounted thereon.

By way of a general description, my device may be said to resemble in its principles of construction and operation, a miniature crane, comprising a frame adapted for being firmly mounted on one section of the tire-rim adjacent the split and so as to project across the latter onto the other rim section, the frame carrying a block movable in a plane co-incident with a chord of the circle of the rim, said block having means for firmly holding one section of the rim adjacent the split, and means being provided for moving the block thereby separating and bringing together again the divided rim section, and other means being provided for moving diametrically inward or outward, the free end of that section held by the block, thereby contracting or re-expanding the rim.

The details of construction and operation are illustrated in the accompanying drawings in which, Fig. 1 is a partial side elevation of a tire rim with my device firmly mounted thereon over the split as in practice;

Fig. 2 is a plan view of the parts illustrated in Fig. 1 to which it relates;

Fig. 3 is a fragmental section of my device taken on line 3—3 of Fig. 2, illustrating one phase of action of my device namely, as here shown my device has been operated to pull the divided sections of the rim apart and to move one section diametrically inward so as to contract the circle of the rim;

Fig. 4 is a transverse section taken on line 4—4 of Fig. 3;

Fig. 5 is a perspective of the movable block of my device carrying the grapple clamped to one of the divided sections of the rim; and Fig. 6 is a cross section of the tire rim and shows fragments of the arms one of the grapples illustrating how it is engaged with the rim.

My device consists of a frame $a$, comprising a leg $b$, adapted for being supported on the tire-rim section $e$, and having a rightangular portion $d$ projecting from one side of the leg $b$, and a strut $c$ projecting from the opposite side of said leg. The strut $c$ is provided with a socket $g$ in which is inserted a screw-rod $f$. On the latter is mounted a winged nut $h$ for raising and lowering said screw rod $f$. A grapple $j$ is pivoted to the opposite end of the screw-rod $f$ as at $i$; the grapple $j$ being adapted to be fastened on the adjacent-section of the rim as shown.

The rightangular part $d$ of the frame $a$ constitutes a guide-way supporting a movable block $m$ which may be constructed as illustrated in Fig. 5.

The screw $q$ is journaled in one end of the block of the angular frame part $d$ and has its other end journaled in a plate $t$ fastened on the opposite end of said frame part $d$ as shown at $u$. The screw $q$ is threaded through the wall $n$ of the block $m$ and extends through the slot $s$ of the wall $n'$ of the block $m$. Hence by the manipulation of the hand wheel $w$, the block $m$ may be moved in a plane co-incident with a chord of the circle of the tire rim.

The top of the block $m$ is recessed to receive the boss 4 of the hand-wheel 5, the eye of which is threaded. The block $m$ is provided with a cavity accommodating the slotted head 2 of the screw 3 which is threaded in the eye of said hand-wheel 5. Said head 2 of the screw 3 pivotally carries a grapple 8. A headed screw 10 extends through the arms of said grapple and is provided with a winged nut 12 by the adjustment of which the arms of the grapple $h$ may be drawn firmly together so as to clamp the rim $e$ as illustrated in Fig. 4. The web $8^a$ of the grapple 8 is recessed as at $8^c$ so as to accommodate the tongue 14 usually provided on one section of the tire-rim and interlocking with the socket 13 provided on the other section on the tire-rim (see Fig. 3).

The block $m$ is recessed as shown in Fig. 5 so as to provide flanges $p$, $p'$ for bearing against the underside of the sides of the walls of the frame part $d$ thereby firmly mounting the block in its said guide-ways.

In order to obtain at all times an efficient hold of the flanged ends $8^b$ of the grapple 8, on the convexed outer face of the rim section on which it is clamped, I prefer to make said flanges convex as illustrated more clearly at $8^b$ in Fig. 1.

My device is used in the following manner:

The leg $b$ of the frame of my device is placed on one section $e$ of the tire-rim adjacent the split, and the grapple $j$ is then fastened to such section. The grapple 8 is next firmly fastened to the other section $e'$ of the rim; the hand-wheel $w$ is then manipulated so as to move the block $m$ to the right with respect to Fig. 1, in so doing, separating the sections of the rim. The hand-wheel 5 is next manipulated so as to move the rim section held by the grapple $h$ diametrically inward, so that the rim section $e'$ will be positioned over the rim section $e$. Then the hand-wheel $w$ is operated to move the block $m$ to the left thereby contracting the circle of the rim as illustrated in Fig. 3. And in order to re-expand and re-unite the divided free ends of the rim, the hand-wheels $w$ and 5 are operated, as apparent, to bring about the reverse motion of the parts, in so doing, finally restoring the tire-rim to its normal state.

I claim:

1. A device of the character described comprising a frame adapted for being firmly mounted on one section of a split tire rim so as to project over the split dividing the rim, a block carried by the frame and movable in a plane co-incident with the chord of the circle of the rim, means provided on said block for firmly holding the end of the other section of the rim, means for moving the block thereby to separate and bring together again the divided rim sections at the split, and other means for moving said rim-holding-means of the block diametrically inward and outward, thereby contracting and re-expanding the rim.

2. A device of the character described comprising a frame consisting of a leg adapted for mounting on a tire-rim and provided with an angular part projecting from one side of the frame in the plane of the circle of the rim on which mounted, a strut projecting from the opposite side of said leg, an adjustable member carried by the strut, a grapple carried by the adjustable member, a block slidable in said angular part of the frame, an adjustable member pendent from the block, a grapple carried by the latter adjustable member, means for drawing the arms of the latter grapple firmly together, means for moving the block.

3. A device of the character described comprising a frame consisting of a leg adapted for mounting on a tire-rim, and provided with an angular part projecting from one side of the frame in the plane of the circle of the rim on which mounted, a strut projecting from the opposite side of said leg, an adjustable member carried by the strut, a grapple carried by the adjustable member, a block slidable in said angular part of the frame, an adjustable member pendent from the block, means for moving the block, a rotary member journaled in the block, a pendent screw-rod threaded in said rotary member, a grapple carried by the screw-rod, and means for drawing the arms of the latter grapple firmly together.

JOHN R. SUPPLE.